(12) United States Patent
Hjortfors

(10) Patent No.: US 9,076,109 B2
(45) Date of Patent: Jul. 7, 2015

(54) METHOD AND SYSTEM FOR CONTROLLING THE AUTHENTITY OF AN OBJECT

(71) Applicant: Jan Hjortfors, Skara (SE)

(72) Inventor: Jan Hjortfors, Skara (SE)

(73) Assignee: Jan Hjortfors, Skara (SE)

( * ) Notice: Subject to any disclaimer, the term of this patent is extended or adjusted under 35 U.S.C. 154(b) by 0 days.

(21) Appl. No.: 14/261,790

(22) Filed: Apr. 25, 2014

(65) Prior Publication Data

US 2014/0319208 A1    Oct. 30, 2014

Related U.S. Application Data

(60) Provisional application No. 61/815,782, filed on Apr. 25, 2013.

(51) Int. Cl.
*G06F 17/00* (2006.01)
*G06Q 10/00* (2012.01)

(52) U.S. Cl.
CPC ..................................... *G06Q 10/00* (2013.01)

(58) Field of Classification Search
USPC ............ 235/375, 487, 462.01, 462.1, 462.09
See application file for complete search history.

(56) References Cited

U.S. PATENT DOCUMENTS

| 5,721,421 A * | 2/1998 | VanDonkelaar .......... 235/462.15 |
| 2006/0175402 A1* | 8/2006 | Maitin .......................... 235/383 |
| 2006/0277059 A1* | 12/2006 | J'maev et al. ..................... 705/1 |
| 2009/0070273 A1* | 3/2009 | Moryto ............................ 705/80 |
| 2011/0154046 A1* | 6/2011 | Fradet et al. ................... 713/179 |
| 2011/0211727 A1* | 9/2011 | Costa et al. .................... 382/100 |
| 2014/0222618 A1* | 8/2014 | Stamp et al. ............... 705/26.35 |

* cited by examiner

*Primary Examiner* — Edwyn Labaze
(74) *Attorney, Agent, or Firm* — Renner, Otto, Boisselle & Sklar, LLP

(57) ABSTRACT

A method, mobile terminal and server for controlling authenticity of a product. Authenticity control includes accessing a database using a unique code provided with the product; providing a secure code related to said product, and receiving authentication information about said product based on said secure code.

18 Claims, 3 Drawing Sheets

METHOD AND SYSTEM FOR CONTROLLING THE AUTHENTITY OF AN OBJECT

TECHNICAL FIELD

The present invention relates to a method, system and devices for authentication of objects in general and control of original products in particular using a mobile terminal and a service provider.

BACKGROUND

The technical advance of manufacturing products, such as spare parts, luxury product, e.g. watches, golf clubs and other objects usually with strong trademarks has resulted in a wealth of copied and counterfeited product. Most of the time, it is very difficult to determine, e.g. through ocular examination, whether a product is an imitation/fake or real/genuine. Many times, it is very difficult or impossible to examine the products before use to determine the genuineness.

Presently, there are no reliable ways to monitor authenticity of a product, which allows the producer and/or trademark owner or seller to provide a buyer information to determine authenticity of a product.

SUMMARY OF THE INVENTION

The present invention provides a system and method allowing an end user to verify authenticity of a product in a simple but reliable way and allows a producer/seller provide information about the authenticity of a product.

For these reasons a method for controlling authenticity of a product is provided comprising: accessing a database using a unique code provided with the product; providing a secure code related to said product, and receiving authentication information about said product based on said secure code. The method may further comprise registering a producer or seller of said product, receiving a client identity (ID), obtaining unique codes for product s from a service provider holder of said database. In one embodiment the product code comprises an identity code and a checking code. The method may comprise registering said product using an identity code, a secret code and an optional check-code in the database. In one embodiment the method comprise registering said product using an identity code, a secret code, an optional check-code and optional additional information comprising one or several of name/trademark, serial number, color or image in the database. The method may also comprise receiving unique codes to be attached or follow the product generated by database computer after a successful product registration. The unique code is one or several of barcode, QR-code or EON-code.

The method may comprise authentication step by providing said unique code by entering or scanning the unique code. In one embodiment, the secure code is controlled and if the secure code is correct, the database replies with a second secure code, which is controlled for authenticity control of the product. If authentication information provides a fake product the fake product information is transmitted to a producer and/or authority.

According to one embodiment the product is a service.

Accessing the database may be done with the identity code and a display check-code provides a limited access to the database to only indicate the product as a displayed product. In one embodiment an Internet Protocol (IP) address of costumer may be logged.

The method may comprise using a check code when selling a product and updating information in the database. The identity code may comprise an additional numerical serial number. The identity code may comprise one or several of a tag, RFID, NFC.

The invention also relates to a mobile terminal comprising a data bus, a processor, a memory, a storage device, an input device, an output device, and a communication interface. The processor is configured to: access a database using a unique code provided with a product, provide a secure code related to said product, and receive authentication information about said product based on said secure code.

The invention also relates to a data processing device comprising: a data bus, a processor, a memory, a storage device comprising information on a number of products, an input device, an output device, and a communication interface. The processor is configured to: receive a unique code associated with said product, access said storage using a unique code provided with a product, receive a secure code related to said product, and retrieve authentication information about said product based on said secure code.

The invention also relates to a method of providing authentication information on a product, the method comprising: receiving a secure code, controlling the product info based on said secure code and a unique access address info, and providing info on product with respect to said secure code and a unique access address info.

BRIEF DESCRIPTION OF THE DRAWINGS

Reference is made to the attached drawings, wherein elements having the same reference number designation may represent like elements throughout.

DETAILED DESCRIPTION

Figure 1:
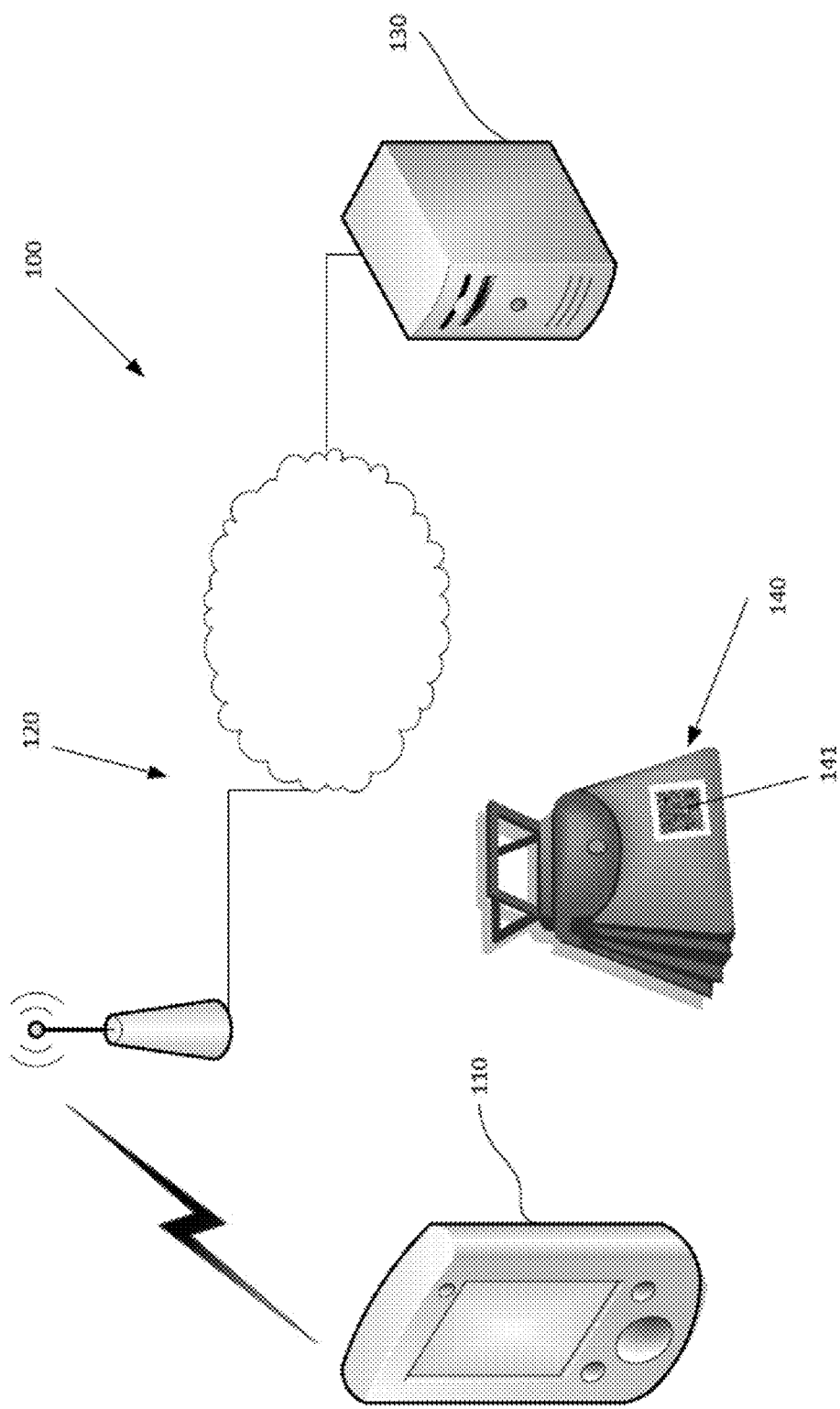
FIG. 1 is a diagram of an exemplary system in which methods and systems described herein may be implemented.

FIG. 1 illustrates a first exemplary embodiment of a system incorporating the teachings of the present invention. The system 100 comprises a detecting unit 110, a communication network 120 and a service provider (illustrated as a server) 130.

The detecting unit according to this embodiment may comprise a so called smart phone 110 and comprises a camera (image recorder) for capturing an image and communication unit for communicating with the communication network. The detecting unit according to this embodiment may also comprise any unit such as a PDA, a laptop having a digital camera or a digital camera with communication ability.

The communication network may comprise wireless communication network such as GSM, LTE, a computer network, PSTN etc.

The server 130 may comprise a computer with ability to store data (database).

To be able to verify a product, according to this embodiment, the product 140 is provided with a unique identification code 141, preferably a readable code such as QR-code, an EON-code or a barcode.

Figure 2:
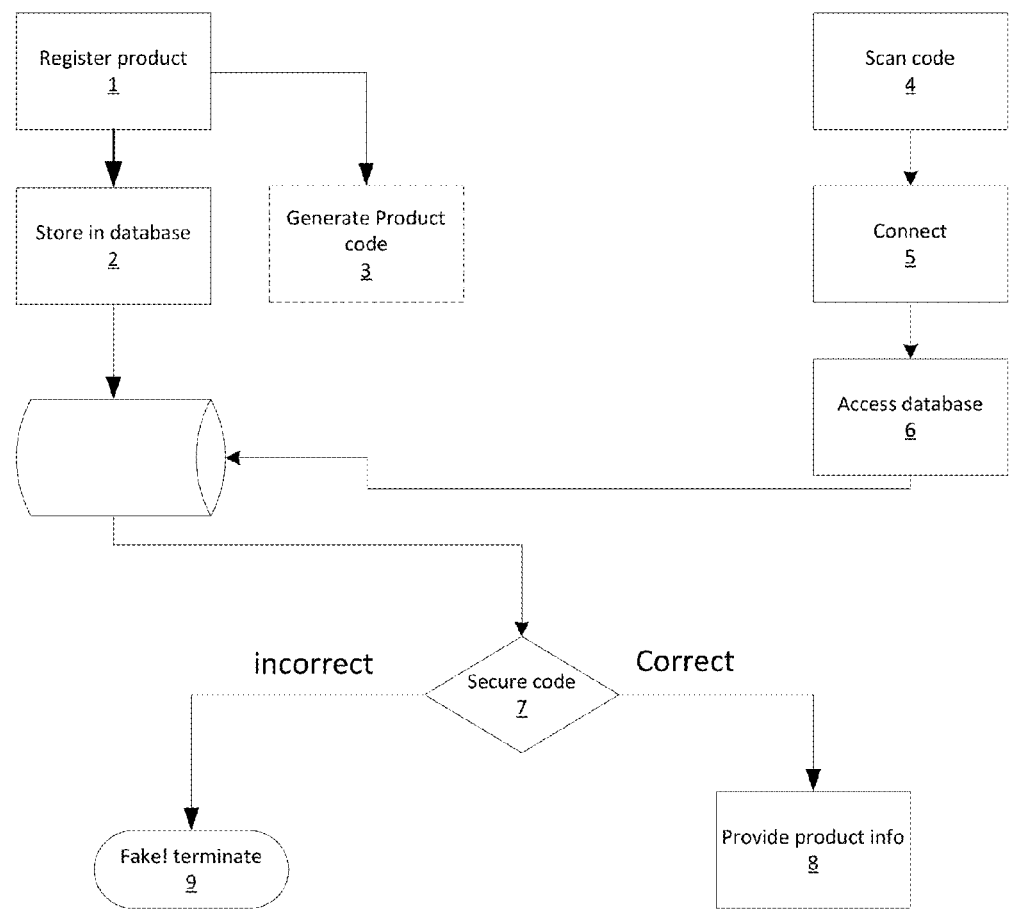
FIG. 2 illustrates a schematic view of steps according to one embodiment method of the invention.

The operation of the system according to one embodiment of the invention is illustrated in flow diagram of FIG. 2:

Firstly, a producer/manufacturer and/or trademark owner or seller (client) may become a client of the service by applying for registration, either through a WEB portal or manually. When the applicant is accepted as client, it will receive a client ID (and login information) to be able to access the service provider database. The client may obtain product codes from the service provider upon successful registration or when a product is to be registered. A product code is a unique code identifying each separate product (or a group of products). The product code may comprise an ID code and a "checking" code (check-code).

According to the illustrated embodiment, the client registers (1) a product, in a first step, using the ID code, a secret code and optional check-code in the database of the server 130. The product, together with its unique ID-code, secret code and check-code and optional additional information such as name/trademark, serial number, color, image, etc., is stored (2) in the database.

Optionally, codes to be attached or follow the product may be generated (3) after successful product registration. The client receives the product codes and provides the products with the unique codes. The product code may be in form of barcode, QR-code, EON-code, attachable to the product.

When a customer buys or wishes to by a product, he/she enters/scans (4) the product code using a terminal, e.g. a smartphone. The terminal (depending on the type of code) connects (6) to the server through the communication network.

The ID code is used to access (5) the service provider and login. The database asks (7) for the secure code (which may be visual for costumer).

If the secure code is correct the database may reply with a second secure code, which costumer may control for authenticity of the product. Of course, here the database may just provide authenticity of the product and product information (8) (name, serial number, image, etc.).

The process may stops (9) if the product is a fake. In one embodiment, the fake product information (together with e.g. position) may be transmitted to the producer and/or authorities.

Figure 3:
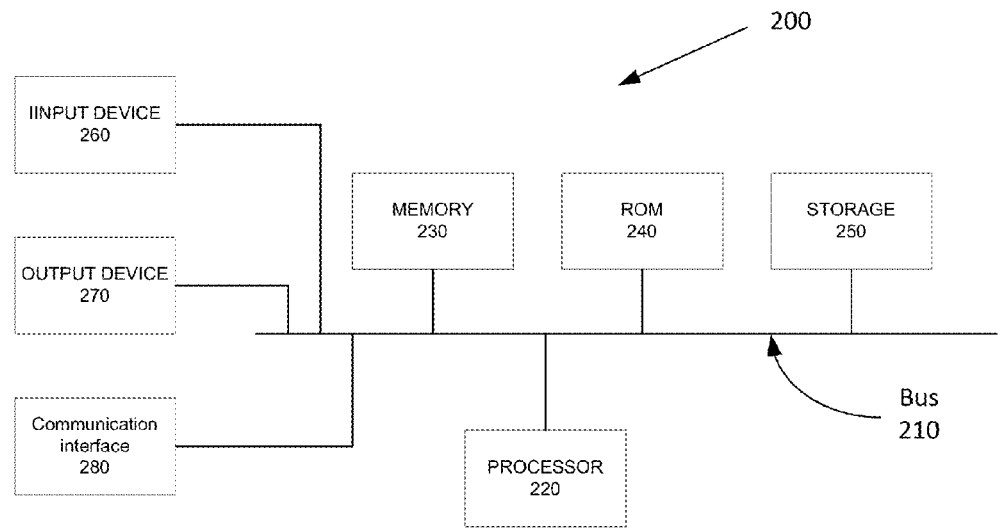
FIG. 3 is a diagram of an exemplary mobile terminal in which parts of methods and systems described herein may be implemented.

FIG. 3 is a diagram of an exemplary mobile terminal 200 in which parts of methods and systems described herein may be implemented. The terminal 200 may include a bus 210, a processor 220, a memory 230, a read only memory (ROM) 240, a storage device 250, an input device 260, an output device 270, and a communication interface 280. Bus 210 permits communication among the components of terminal 200. Terminal 200 may also include one or more power supplies (not shown). One skilled in the art would recognize that terminal 200 may be configured in a number of other ways and may include other or different elements.

Processor 220 may include any type of processor or microprocessor that interprets and executes instructions. Processor 220 may also include logic that is able to decode media files, such as audio files, video files, multimedia files, image files, video games, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more conventional mechanisms that permit a user to input information to the terminal 200, such as a keyboard, a keypad, a directional pad, a mouse, a pen, voice recognition, a touch-screen and/or biometric mechanisms, etc. Output device 270 may include one or more conventional mechanisms that output information to the user, including a display, a printer, one or more speakers, etc. Communication interface 180 may include any transceiver-like mechanism that enables terminal 200 to communicate with other devices and/or systems. For example, communication interface 280 may include a modem or an Ethernet interface to a LAN. Alternatively, or additionally, communication interface 280 may include other mechanisms for communicating via a network, such as a wireless network. For example, communication interface may include a radio frequency (RF) transmitter and receiver and one or more antennas for transmitting and receiving RF data.

Terminal 200, consistent with the invention, provides a platform through which a user may play and/or view various media, such as music files, video files, image files, games, multimedia files, etc. Terminal 200 may also display information associated with the media played and/or viewed by a user of terminal 200 in a graphical format, as described in detail below. According to an exemplary implementation, terminal 200 may perform various processes in response to processor 220 executing sequences of instructions contained in memory 230. Such instructions may be read into memory 230 from another computer-readable medium, such as storage device 150, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

Figure 4:
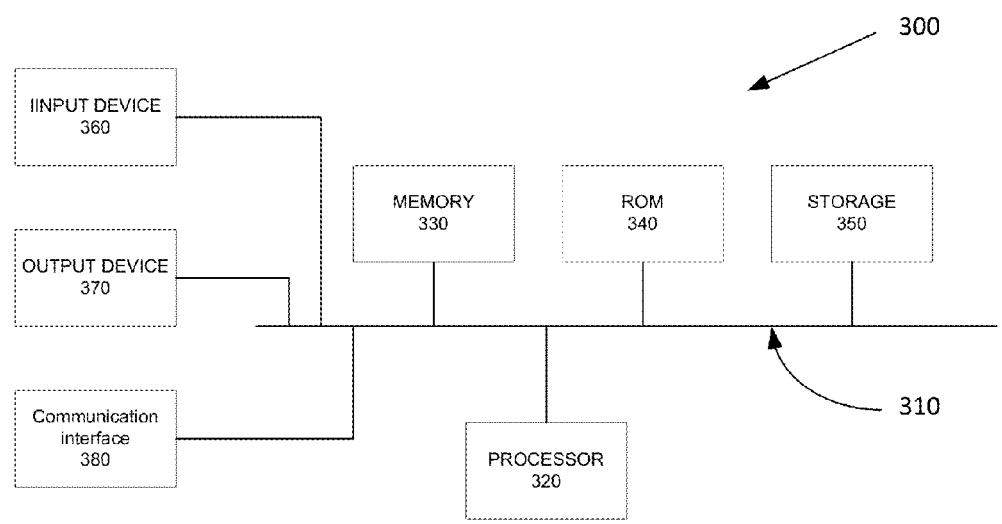
FIG. 4 is a diagram of an exemplary server in which parts of methods and systems described herein may be implemented.

FIG. 4 is a diagram of an exemplary server 200 (data processing device) in which parts of methods and systems described herein may be implemented. The server 300 may include a bus 310, a processor 320, a memory 330, a read only memory (ROM) 340, a storage device 350, an input device 360, an output device 70, and a communication interface 380. Bus 310 permits communication among the components of server 300. Server 300 may also include one or more power supplies (not shown). One skilled in the art would recognize that server 300 may be configured in a number of other ways and may include other or different elements.

Processor 320 may include any type of processor or microprocessor that interprets and executes instructions. Processor 320 may also include logic that is able to decode media files, such as audio files, video files, multimedia files, image files, video games, etc., and generate output to, for example, a speaker, a display, etc. Memory 330 may include a random access memory (RAM) or another dynamic storage device that stores information and instructions for execution by processor 320. Memory 230 may also be used to store temporary variables or other intermediate information during execution of instructions by processor 320.

ROM 340 may include a conventional ROM device and/or another static storage device that stores static information and instructions for processor 320. Storage device 350 may include a magnetic disk or optical disk and its corresponding drive and/or some other type of magnetic or optical recording medium and its corresponding drive for storing information and instructions. Storage device 350 may also include a flash memory (e.g., an electrically erasable programmable read only memory (EEPROM)) device for storing information and instructions. The database as mentioned earlier may be stored on the storage device In one embodiment, accessing the database with the ID code and a display check-code may provide limited access to the database to only indicate the product as a displayed product. A shop may obtain especial indicating code for products to be displayed.

In one embodiment the IP addresses of the costumers may be logged. This may be used for marketing or other purposes.

When a product is to be soled the check code may be used and the information updated in the database.

The ID code may comprise an additional numerical serial number. The ID code may also be a tag, such as RFID, NFC or similar techniques. Thus, the terminal may have communication ability with RFID or NFC or similar techniques.

The invention allows the service provider to charge one or several of producer, retailing and the costumer for its services. The producer may be charged when registering product(s), the retailing may be charged when using the register for selling or controlling and the costumer when controlling the product.

The invention may also be used for controlling authenticity of services, e.g. secure transmission, authentication of users etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

A "terminal" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A method for controlling authenticity of a product, the method comprising:
    accessing a data processing device including a database using a product code comprising a unique code provided with the product, wherein:
        the product code is generated by the data processing device after the product is successfully registered with the data processing device;
        the product code includes an identity code and a check code; and
        the check code provides additional product information;
    providing to the data processing device a secure code associated with the product, and
    receiving authentication information indicating the authenticity of the product based on the secure code.

2. The method of claim 1, comprising registering a producer or seller of said product.

3. The method of claim 2, comprising receiving a client identity (ID).

4. The method of claim 2, comprising obtaining unique codes for products from a service provider holder of said database.

5. The method of claim 1, comprising registering said product using an identity code, a secret code and an optional check-code in the database.

6. The method of claim 1, comprising registering said product using an identity code, a secret code, an optional check-code and optional additional information comprising one or several of name/trademark, serial number, color or image in the database.

7. The method of claim 1, wherein said unique code is one or several of barcode, QR-code or EON-code.

8. The method of claim 1, comprising authentication step by providing said unique code by entering or scanning the unique code.

9. The method of claim 1, wherein said secure code is controlled and if the secure code is correct the database replies with a second secure code, which is controlled for authenticity control of the product.

10. The method of claim 1, wherein if authentication information provides a fake product the fake product information is transmitted to a producer and/or authority.

11. The method of claim 1, wherein said product is a service.

12. The method of claim 1, wherein accessing the database with the identity code and a display check-code provides a limited access to the database to only indicate the product as a displayed product.

13. The method of claim 1, logging an Internet Protocol (IP) address of costumer.

14. The method of claim 1, wherein when selling the product, the check code is provided to the data processing device and used to update information stored in the database.

15. The method of claim 1, wherein identity code comprises an additional numerical serial number.

16. The method of claim 1, wherein identity code comprises one or several of a tag, RFID, NFC.

17. A mobile terminal comprising a data bus, a processor, a memory, a storage device, an input device, an output device, and a communication interface, wherein said processor is configured to:
  access a data processing device including a database using a product code comprising a unique code provided with a product, wherein:
    the product code is generated by the data processing device after the product is successfully registered with the data processing device;
    the product code includes an identity code and a check code; and
    the check code provides additional product information;
  provide to the data processing device a secure code associated with the product, and
  receive authentication information indicating the authenticity of the product based on the secure code.

18. A data processing device comprising:
a data bus,
a processor,
a memory,
a storage device comprising information on a number of products,
an input device,
an output device, and
a communication interface,
said processor is configured to:
  receive a product code comprising a unique code associated with a product of the number of products, wherein:
    the product code is generated by the processor after the product is successfully registered with the data processing device;
    the product code includes an identity code and a check code; and
    the check code provides additional product information;
  access said storage using the unique code provided with the product,
  receive a secure code related to said product, and
  retrieve and output authentication information indicating the authenticity of the product based on said secure code.

* * * * *